(12) United States Patent
Hollingsworth

(10) Patent No.: US 6,985,910 B2
(45) Date of Patent: Jan. 10, 2006

(54) TILTING TREE SPINNING CONES METHOD AND SYSTEM FOR MAPPING XML TO N-DIMENSIONAL DATA STRUCTURE USING A SINGLE DIMENSIONAL MAPPING ARRAY

(75) Inventor: James Lewis Hollingsworth, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/361,170

(22) Filed: Feb. 6, 2003

(65) Prior Publication Data

US 2004/0162813 A1   Aug. 19, 2004

(51) Int. Cl.
G06F 17/30 (2006.01)
(52) U.S. Cl. ........................................ 707/102; 707/10
(58) Field of Classification Search .............. 707/1–10, 707/100–104.1, 200–206; 709/230, 329, 709/246; 715/513; 717/143
See application file for complete search history.

(56) References Cited

U.S. PATENT DOCUMENTS

| | | | | |
|---|---|---|---|---|
| 5,943,674 | A | 8/1999 | Schofield | 707/104 |
| 6,209,124 | B1 | 3/2001 | Vermeire et al. | 717/1 |
| 6,301,579 | B1 | 10/2001 | Becker | 707/102 |
| 6,336,214 | B1 * | 1/2002 | Sundaresan | 717/143 |
| 6,502,101 | B1 | 12/2002 | Verprauskus et al. | 707/101 |
| 6,795,868 | B1 * | 9/2004 | Dingman et al. | 709/246 |
| 6,820,135 | B1 * | 11/2004 | Dingman et al. | 709/246 |
| 2002/0042849 | A1 * | 4/2002 | Ho et al. | 709/329 |
| 2002/0046294 | A1 | 4/2002 | Brodsky et al. | |
| 2002/0161907 | A1 * | 10/2002 | Moon | 709/230 |
| 2004/0268242 | A1 * | 12/2004 | Layman et al. | 715/513 |
| 2005/0055336 | A1 * | 3/2005 | Hui et al. | 707/3 |

FOREIGN PATENT DOCUMENTS

| | | |
|---|---|---|
| EP | 1231547 A2 | 8/2002 |
| WO | WO0165419 A2 | 9/2001 |

OTHER PUBLICATIONS

H.V. Jagadish et al., On effective multi-dimensional indexing for strings, (2000), ACM Press, NY, NY., pp. 403-414.*
Robert Van Engelen, Code generation techniques for developing light-weight XML Web services for embedded devices, (2004), ACM Press, NY, NY, pp. 854-861.*

(Continued)

Primary Examiner—Diane Mizrahi
(74) Attorney, Agent, or Firm—Robert H. Frantz; David A. Mims, Jr.

(57) ABSTRACT

A tilting tree, spinning cones process is employed to map n-dimensional array data originally in markup language, to an n-dimension table suitable for use by COBOL application programs. Mapping is performed without scanning the result array for an empty slot. This allows the result array slots to be pre-loaded with state data. During mapping, the hierarchical nature of the markup language n-dimensional data is represented in two-dimensions using an inverted tree structure having cones for each array level. The tree is tilted to bring a member of a given level into contact with one of the axes of the tree graph, followed by spinning appropriate cones to bring a certain member of that level into contact with the same axis. This results in the ability to use a one-dimensional mapping array. The dimension offset on the mapping axis can then be used as an index value into the mapped array output for storage or retrieval of element data.

18 Claims, 5 Drawing Sheets

| Memory Address | X | X+2 | X+6 | X+10 | X+14 | X+16 | X+20 | X+24 |
|---|---|---|---|---|---|---|---|---|
| Element Value | aa | 0001 | 0002 | 0003 | bb | 0004 | 0005 | 0006 |
| Element index | x(1) | y(1,1) | y(1,2) | y(1,3) | x(2) | y(2,1) | y(2,2) | y(2,3) | row 1 / row 2

OTHER PUBLICATIONS

Tak Wong et al, XML implementation of frame processor, (2001), ACM Press, NY, NY, pp. 164-172.*

Albrecht Schmidt, et al., "Efficient Storage and Retrieval of XML Documents" WebDB (informal Proceedings) (2000).

Takeyuki Shimura, et al., "Storage and Retrieval of XML Documents Using Object-Relational Databases" DEXA (1999).

Sneed, H.M., "Wrapping legacy COBOL programs behind an XML-interface" IEEE, Oct. 2, 2001, pp. 189-197, p. 194, col. 2, line 20—p. 195, col. 1, line 13, figures 4-7.

Funderburk, J.E., et al, "XTABLES: bridging relational technology and XML" IBM Syst., J. (USA), IBM Systems Journal, 2002, IBM, USA, vol. 41, No. 4, 2002, pp. 616-641, p. 631, col. 1, line 5—pp. 633, col. 2, line 25.

Florescu, D., et al, "A Performance Evaluation of Alternative Mapping Schemes for Storing XML Data in a Relational Database" INRIA Rapport De Recherche No. 3680, May 1999, pp. 1-31, Le, France, Paragraph 3: "Storing XML Documents in Relational Databases".

Shanmugasundaram, J., et al, "Relational databases for querying XML documents: limitaitns and opportunites" Proceedings of 25th International Conference on Very Large Databases, Edinburgh, UK, Sep. 7, 1999, pp. 302-314, Orlando, Florida.

* cited by examiner

| Memory Address | X | X+4 | X+8 | X+12 | X+16 | X+20 |
|---|---|---|---|---|---|---|
| Element Value | 1 | 4 | 9 | 16 | 25 | 36 |
| Element Index | e(1) | e(2) | e(3) | e(4) | e(5) | e(6) |

Figure 1

| Memory Address | X | X+2 | X+6 | X+10 | X+14 | X+16 | X+20 | X+24 |
|---|---|---|---|---|---|---|---|---|
| Element Value | aa | 0001 | 0002 | 0003 | bb | 0004 | 0005 | 0006 |
| Element index | x(1) | y(1,1) | y(1,2) | y(1,3) | x(2) | y(2,1) | y(2,2) | y(2,3) | row 1 : x(1), y(1,1), y(1,2), y(1,3)
row 2 : x(2), y(2,1), y(2,2), y(2,3)

Figure 2

TILTING TREE SPINNING CONES METHOD AND SYSTEM FOR MAPPING XML TO N-DIMENSIONAL DATA STRUCTURE USING A SINGLE DIMENSIONAL MAPPING ARRAY

BACKGROUND OF THE INVENTION

1. Field of the Invention

This invention relates to methods and processes for translating data from one format or programming paradigm to another programming format or paradigm, and especially to methods for converting Extensible Markup Language data structures to COBOL data structures.

2. Background of the Invention

Common Business Oriented Language or "COBOL" is one of the oldest high-level computer programming languages still in widespread use today. Like other programming languages, COBOL is designed to allow development of computer programs that perform specific purposes and tasks. COBOL is especially well suited for business data processing tasks, as opposed to scientific or engineering data processing tasks. Business oriented data is characterized by "transactions", often which are either reflections of manually-conducted activities (e.g. sales, deposits, withdrawals, etc.) or reflections of automatically-conducted activities (e.g. compounding of interest on a principal amount). A common "output" of business-oriented tasks is a "report". As such, COBOL is tailored to collect, organize, validate, update, process and report with respect to business-oriented data.

As COBOL was originally targeted to and executed by large "mainframe" business computers, it was one of the original languages employed in the "client-server" topologies of 20 to 30 years ago. As evolution of computing has brought processing paradigms full circle with the advent of "thin clients", networked servers, wide area networks and the Internet, "client-server" architectures-are once again in favor, albeit the "clients" are now commonly web browser computers, and the servers are many thousands of times more capable in processing bandwidth, storage capacity, and communications capabilities.

COBOL, and related products and systems such as International Business Machine's ("IBM's") Customer Information Control System ("CICS"), and IBM's Information Management System ("IMS") are well known in the industry, being employed in business and government enterprises ranging from banking, finance, investment, insurance, to manufacturing and service operations.

As newer programming languages such as object-oriented languages including "C", "C++", and Sun Microsystem's Java [TM], have found widespread acceptance in the software industry, some may be led to believe that COBOL, IMS, CICS, and similar products and languages are of limited future value. Regardless of whether COBOL, CICS, and IMS/DC are recognized as strategic products, from a business case perspective, there are literally billions of lines of COBOL business application code in use today. While Java has now become the application development language of choice, until recently COBOL was the main application development language, in use since the early 1970's, in both CICS and IMS/DC transaction processing environments. For example, in 1999, the IBM Hursley (United Kingdom) development laboratory estimated that more than 20 billion transactions per day were processed in IBM's customers' CICS installations worldwide. Therefore, COBOL remains an important technology, and problems arising from interfacing and interacting COBOL resources with newer technology resources (e.g. applets, servlets, etc.) must be addressed as inventively as any other "cutting edge" technology problem. For example, and inefficient solution to a COBOL problem which is executed 20 billion times per day accumulates to massive wasted processing bandwidth, memory and storage waste, and communication inefficiencies. By the very nature of COBOL applications (e.g. business transactions), such results manifest themselves as increased costs, latency to complete transactions, and reduced profits.

The more modern concept of "Data Mining" can be summarized as the ability to re-use business application logic from existing application programs to solve business problems in the future. Data Mining implementations exist in varying degrees of sophistication. For example, a simple application refacing solution may use a Web browser connected to a Web Server, which in turn accesses data from a transaction-processing server using an Extensible Markup Language ("XML") interface. In another example, a tightly coupled business-to-business ("B2B") application may connect a company to a supplier, where an XML document serves as the common data transport. In this example, it can be seen that XML-based servers will enable the evolution of Web Services to access older "legacy" data such that a business can greatly extend its reach to customers over time while continuously updating, upgrading, and migrating its business application programs to offer enhanced services and products with ever-increasing cost and response efficiencies.

As such, the networked economy is driving the businesses from rigidly designed business computing systems to employ flexible application design on scalable computing platforms, from static to dynamic interaction-between partners, and from technology integration to business integration.

So, two extremes in technology are firmly established—billions of lines of code of COBOL representing untold billions of dollars of business investment on one end, with XML data transport technology ensuring the ability of future business applications to access and use legacy data. Neither XML or COBOL may be used exclusively. However, there are significant technical challenges to interfacing COBOL and XML to each other, especially with respect to multi-dimensional arrays or "tables" of data which are so prevalent in today's business application requirements.

Brief Review of COBOL Field Definitions and Tables

While COBOL is well known in the art, it will be useful to briefly review the implementation of "tables" or "arrays" of data in COBOL in order to fully understand the impact of converting tabular or indexed data structures to and from COBOL and XML.

In COBOL syntax, a "picture" clause is used to define a field for use, such as shown in Table 1.

TABLE 1

Example COBOL Field Definition

```
01 Data - Field
   02 Data - Item - 1    Pic X(1).
   03 Data - Item - 2    Pic X(1).
```

In this example, two data items, both being alphanumeric fields, are defined with a "precision" of one character. The "X" following the "Pic" indicates the field is alphanumeric, and the "(1)" following the "X" indicates the field is 1 character in length. A "Pic 9(3)" field type would be a numeric field having 3 digits, as would be a "Pic 999" field type. Other field types, such as literals, and numerics with decimal (e.g. fractional components) may be defined, as is well known in the art. Fields may be defined within groups, as indicated by elementary levels within group levels, as is also well known within the art.

So, for example, a customer information record could be defined as shown in Table 2, wherein the customer name may have up to 30 characters, the telephone number 10 digits, and the account number 18 alphanumeric characters.

TABLE 2

Example Customer Information Defined in COBOL

```
01 Data - Field
   02 Customer - Name      Pic X(30).
   03 Customer - Telephone Pic 9(10).
   04 Customer - Acctnum   Pic x(18).
```

This type of customer data is often organized into arrays or tables of information, such as arrangements employed by relational database application programs.

Implementation and storage layout of an array structure varies by language. The COBOL language table structure, implemented by use of the COBOL "occurs" clause, stores array elements in consecutive memory locations.

For example, a one-dimensional array T beginning at memory location X, containing six elements e, where each element is four characters in length, is defined in a COBOL program as follows:

```
01 T.
   05 e OCCURS 6 TIMES PICTURE 9999.
```

FIG. 1 shows the table represented by this data structure definition. As in other programming languages, COBOL organizes data into arrays according to their definitions with respect to size (e.g. dimension) and field types. Multiple methods of declaring such tables, however, may result in different actual run time implementations of the data structure, especially with respect to the physical organization of the data when stored in memory. For example, Table 3 shows an example single-index (e.g. mono-dimension) array in COBOL, in which an 8-character alphanumeric field is defined in an array of seven fields.

TABLE 3

Example Single Dimension Table Definition in COBOL

```
01 DaysOfWeek - Table.
   03 Day - Name     Pic X(8) Occurs 7 Times.
```

During initialization of a program using such an array or immediately following the definition of such an array as shown in Table 3, the initial values (e.g. strings containing the weekday names) of the fields could be set using a COBOL "move" verb, such as shown in Table 4.

TABLE 4

Example Table Initialization in COBOL

| 000061 | Move "Monday" To DAY-Name(1) |
| 000062 | Move "Tuesday" To DAY-Name(2) |
| 000063 | Move "Wednesday" To DAY-Name(3) |
| . | |
| . | |
| . | |
| 000067 | Move "Sunday" To DAY-Name(7) |

Once the table is loaded or initialized, individual field values can be quickly and directly accessed using the day number index, and specialized verbs such as the COBOL "search" verb, can be used to inspect or verify the information.

However, most business oriented data cannot be as simply organized as a single-dimension array. For example, customers may be organized by product type, sales volume, geographic location, etc. COBOL allows for multi-dimensional tables to be defined essentially as tables of tables, as shown in Table 5.

TABLE 5

Example Multi-Dimensional Table Definition in COBOL

```
000040 01 Sales-Transactions.
          03 Customer-Num Occurs 100 Times Indexed by Cust-Index
             05 Order-Num Pic X(3) Occurs 15 Times Indexed by
                Order-Index
                07 Order-Items Pic X(45) Occurs 25 Times
                   Indexed by Item-Num
```

In this example, 100 different customers, each with a customer number, are tracked for 15 orders (each with an order number), with each order having up to 25 items listed or described using up to 45 characters in each item description. In COBOL implementation, this is realized as 15 tables of 25 fields, further organized into an array of 100 tables (e.g. 100×15×25).

Multidimensional COBOL tables are stored in row major order, in which rows are, placed one after another in memory, as is described in the text "Data Structures & Their Algorithms" by Harry R. Lewis and Larry Denenberg (HaiperCollins, 1991). The row is defined as the first index, where a table having three dimensions and indexed by the 3-tuple (x, y, z), x is the index for the row.

For example, a two-dimensional array T beginning at memory location X, containing two rows and three columns, where each element (x) is two characters in length, and each element (y) is four characters in length, as defined in a COBOL program with the three COBOL statements:

```
01 T.
   05 x OCCURS 2 TIMES PICTURE XX.
      10 y OCCURS 3 TIMES PICTURE 9999.
```

FIG. 2 depicts how this structure is represented as a table in contiguous storage. This method of storage provides an efficient means for fast access of the table elements, located in main memory, by the application program but can be inefficient for long term storage and retrieval, where storage space is at a premium.

For example, databases may store sparse arrays (partially filled arrays) by using linked lists or a hierarchical table of pointers. During processing the application program may decide to store the array elements in a database.

n-Dimensional Array Data Mapping Between Markup Language and COBOL

An XML document request can originate from an external source (e.g. another company, another agency, another enterprise, etc.), or it can be generated by a network server that requires an XML interface to access mainframe applications. Mapping an XML document to COBOL data structures is distinct from the challenge of developing algorithms for the efficient storage and retrieval of XML documents on mass media.

An XML parser and mapper are somewhat straightforward to develop for simple XML documents. The challenge, however, arise when mapping XML documents that may have multi-dimensional table or array data. This requirement, though, is actually very common.

For example, a system for displaying information about an athletic sport league might use an XML document to display statistics for an individual player, within a team, within a conference, within a division, and within a league. The resulting structure would be a 4-dimensional array.

An example using the National Football League ("NFL") can be used to illustrate the general conceptual procedure for mapping a data element into the result array. In this example, the NFL divisions are the first dimension (w), the conferences are the second dimension (x), the teams are the third dimension (y), and the players are the fourth dimension (z). If a team name is parsed from the XML document containing the relevant statistics, the following procedure must be followed to map the team name into the result array:

1. Identify the result array dimension. The parsed XML tag and element might appear as:

<team_name>Dolphins</team_name>

The tag name can be used to determine that team_name belongs to the teams dimension (the third dimension).

2. Navigate to the identified target dimension. The Dolphins are a team in the AFC East conference, which is in the AFC division. If we have previously parsed and mapped elements for the NFC division, and AFC West, AFC Central, and AFC East conferences in the AFC division, then we have progressively navigated through (1, x, y, z), (2, 1, y, z) and (2, 2, y, z). We are currently processing teams in the AFC East conference, so we know that the array index will be (2, 3, y).

3. Determine the target dimension array index. In this case, the target dimension array index is the value for y. The system, then, searches for the first empty team_name bucket in the target dimension (y). If this is the third team that we have processed in the AFC East, then the third bucket will be empty, and the target dimension array index will be 3.

4. Move the current data value into the empty field in the array (the array field may or may not be empty). In this example, we finally move the value "Dolphins" to (2, 2, 3) in the result array.

However, actually designing a software implementation for this general conceptual procedure presents challenges to developing an efficient method to navigate the result array, and for determining the target dimension array index, especially if the result array has been pre-loaded with state data. Therefore, there is a need in the art for a method and system which efficiently maps multi-dimensional table array data to and from XML and COBOL.

BRIEF DESCRIPTION OF THE DRAWINGS

The following detailed description when taken in conjunction with the figures presented herein provide a complete disclosure of the invention.

FIG. 1 provides a tabular illustration of a one-dimensional array.

FIG. 2 likewise provides an illustration of the linear nature which COBOL uses to store tabular data.

SUMMARY OF THE INVENTION

Our new tilting tree, spinning cones process can be employed to efficiently map multi-dimensional array data contained in markup language documents, such as XML, to data structures suitable for use by COBOL application programs. The process maps the data in a significantly more efficient manner, thereby allowing more data to be mapped with reduced processing resources.

First, a two-dimensional inverted tree structure using cones to represent the XML arrays is virtualized, which achieves mapping the n-dimensional XML data to a two-dimensional representation. Next, the inverted cone tree is repositioned on the two-dimensional graph by tilting it so that one array (cone) member in each dimension lays flat against an axis, such as the y-axis. This axis is now referred to as the mapping axis. Now the dimensions in the XML structure correspond to y-axis segments.

Finally, by spinning the cones (e.g. rotating the arrays) one at a time, every member of every array can be brought into contact with the mapping axis. The dimension segments of the mapping axis can be represented as a one-dimensional or linearly organized array, suitable for COBOL application programs.

DESCRIPTION OF THE INVENTION

The present invention is preferrably embodied in computer programs which provide interfacing of n-dimensional data structures between formats such as Extensible Markup Language ("XML") and structured programming formats such as COBOL. The present invention may be embodied as software in a high level language (COBOL, C, C++, Java, etc.), low level or assembly language, or even in programmable or fixed-design firmware and logic for use in computing systems such as enterprise servers.

A Generic Converter solution for Web enabling CICS applications including an interface to the 3270 Bridge to provide access to 3270 applications, has been available from International Business Machines in one form or another for some time.

The Generic Converter solution has now been further enhanced with an XML interface containing our inventive "tilting tree, spinning cones" process. This enables Java developers to be solution participants by providing WebSphere Java clients. This is the subject of the present invention.

Figure 3:
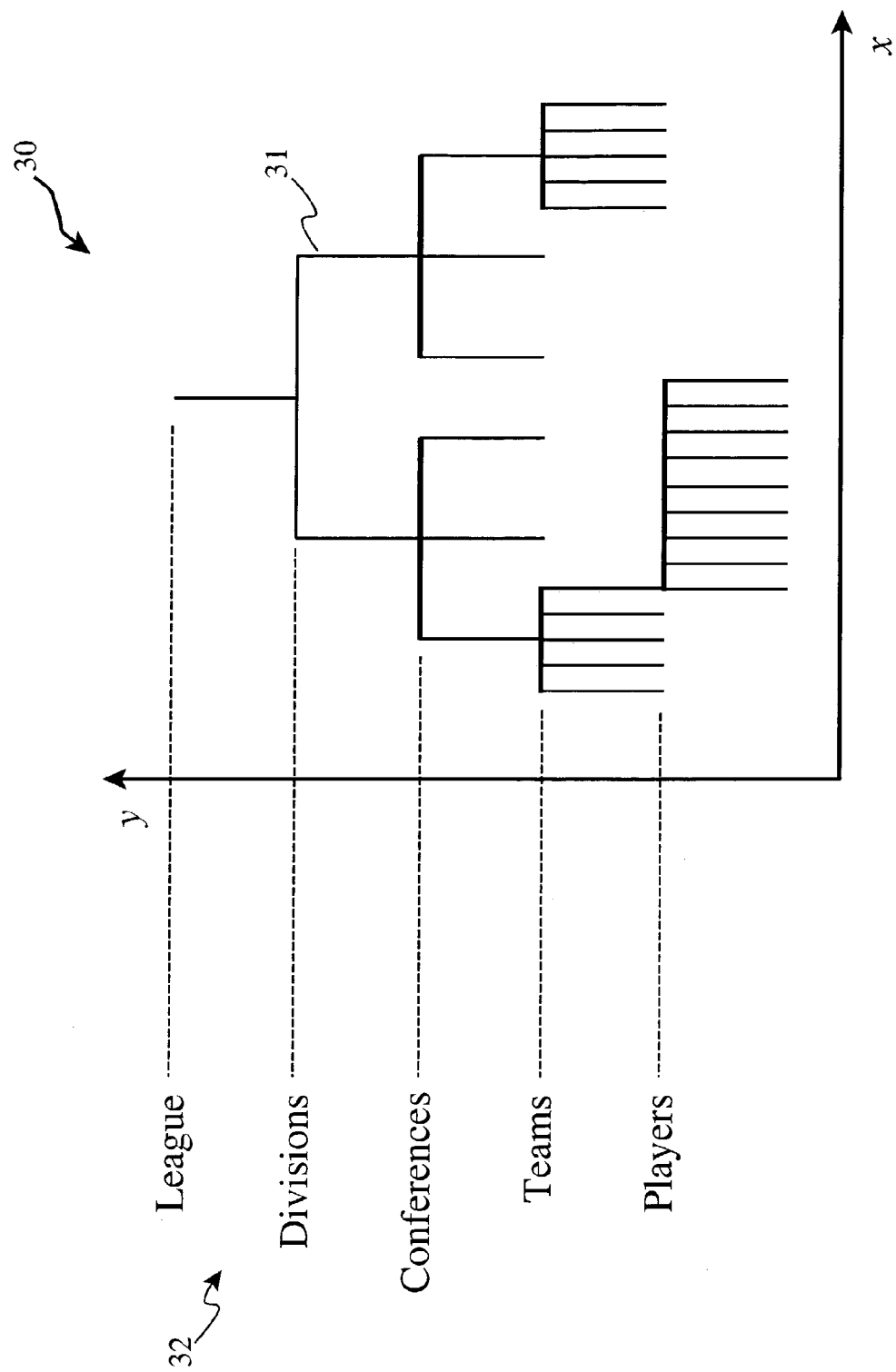
FIG. 3 illustrates the hierarchical organization of XML data structures.

To present the process of the invention, it is useful first to review how n-dimensional arrays are represented in XML. The structure of an XML document is typically illustrated as an inverted tree (30), as shown in FIG. 3. The main root, at the top, branches to progressively lower levels or dimensions. The vertical members, at any particular level, represent array elements at that level.

The following example shows a graphed XML structure according to our NFL example, with League as the root element, Divisions as the first dimension array, Conferences as the second dimensional array, Teams as the third dimension array, and Players as the fourth dimension array (32). It can be seen from this diagram that all elements of the XML document may be represented in a two-dimensional space in this manner. This is true without regard to the number of dimensions (y-axis) or the size of an individual array (x-axis).

At the conclusion of the foregoing general conceptual procedure discussion, we indicated that the result array might be pre-loaded with state data prior to parsing and mapping XML document array elements. Therefore, it would be unreliable to use the result array to determine the mapping of a parsed XML document array element based on the presence of data in the result array. However, using this approach, an n-dimensional result array can be represented in a two-dimensional space, which makes it possible to create a mirror array of the n-dimensional result array that can be used for mapping.

Unfortunately, this mirror array could become quite large. The simple football league example, holding 20 items of information at each dimensional level, would require a mirror array at least 50 k bytes in size. Moreover, searching for the correct array dimension (e.g. navigating the table) could be cumbersome and inefficient if higher dimension levels need to be re-navigated for every data element.

However, our new tilting tree, spinning cones process can be employed, resulting in representations which require much less storage space, 164 bytes for our example, and is much more efficient at mapping. The following discussion and illustrations explain this process.

Figure 4:
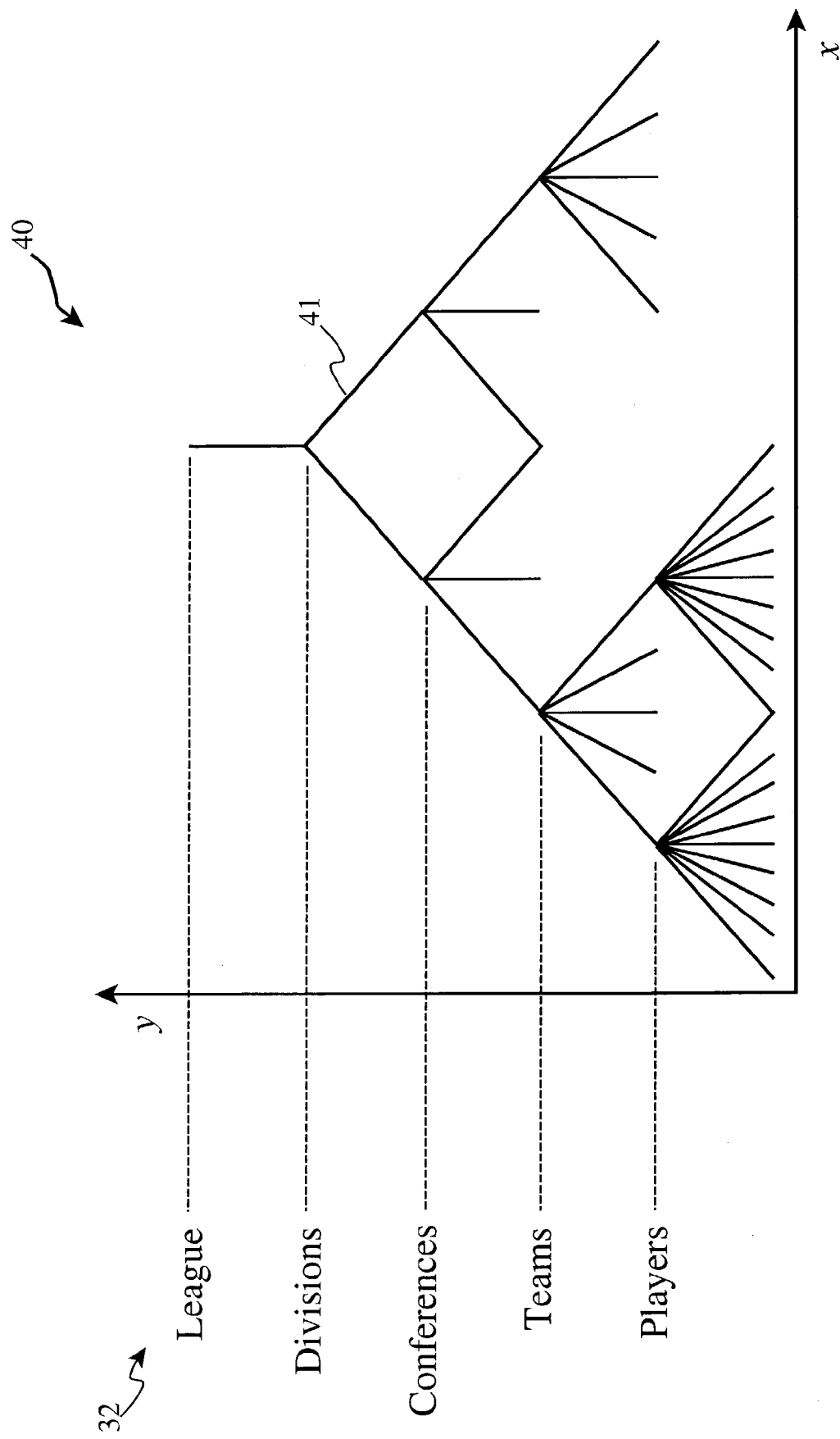
FIG. 4 depicts the first step of our tilted tree, spinning cones process in which the squared groups within the hierarchy are replaced with cones.

First, an inverted tree structure (40), similar to that shown in FIG. 3, may also be illustrated using cones (41) to represent the arrays, as shown in FIG. 4.

Figure 5:
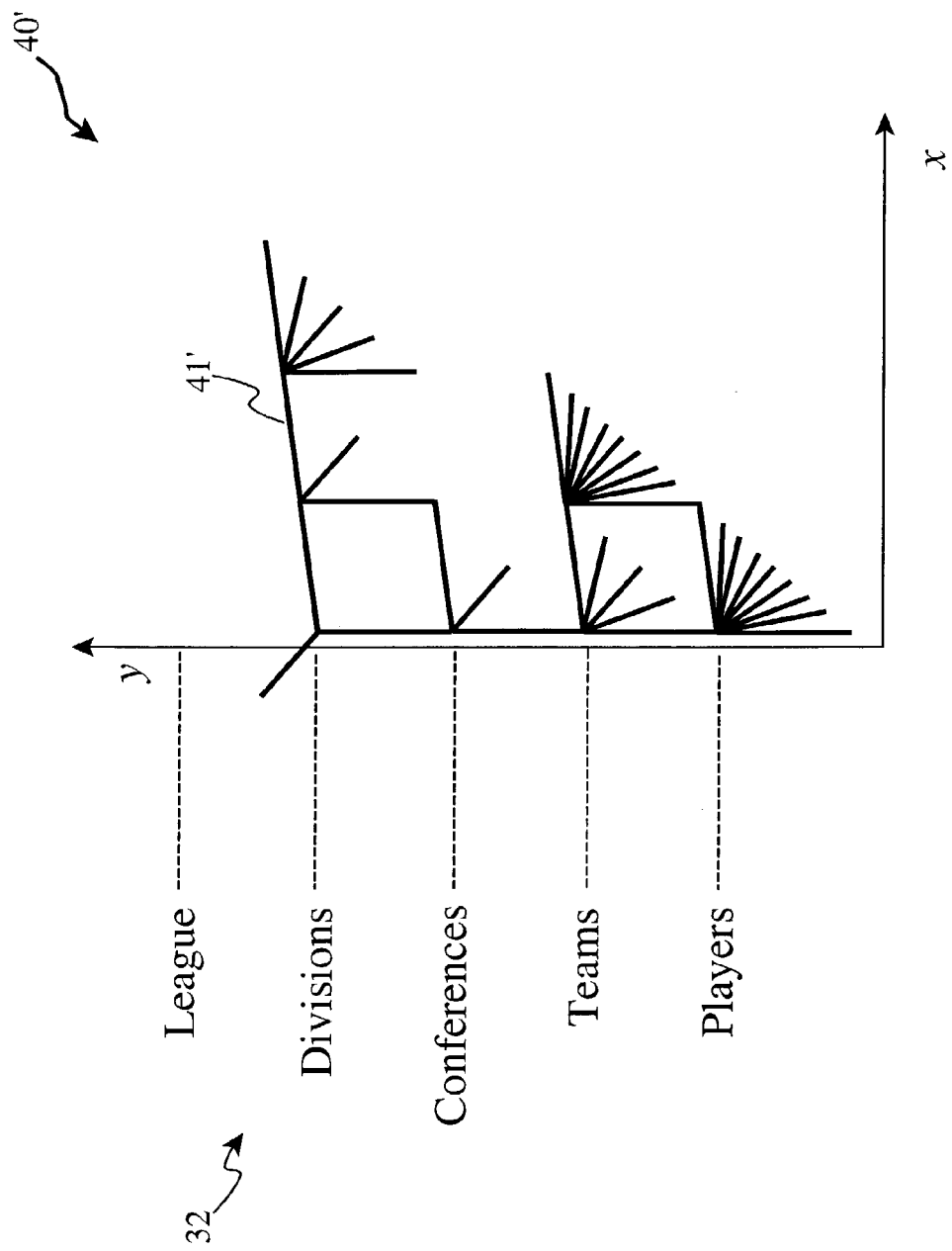
FIG. 5 shows a subsequent step of our tilted tree, spinning cones process in which the tree is tilted to bring in into congruence with one of the two axes (a mapping axis) in the graph.

Next, the inverted cone tree is repositioned on the graph by tilting it so that one array (cone) member in each dimension lays flat against an axis. Now the dimensions (32) in the XML structure (41') correspond to y-axis segments, as shown in FIG. 5.

Figure 6:
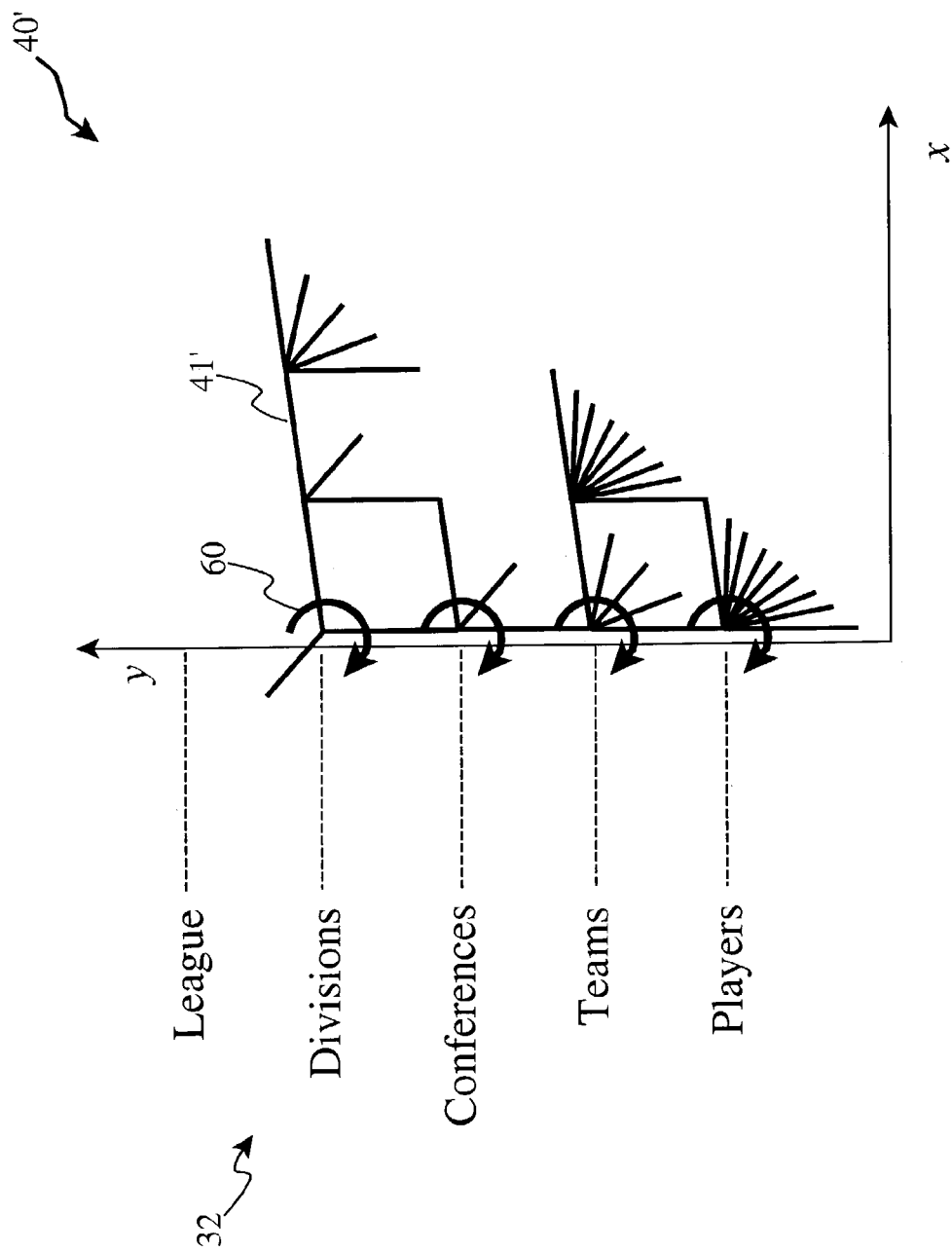
FIG. 6 illustrates the spinning action of our tilted tree, spinning cones process which allows each member of each group (e.g. each array) in the hierarchy to be brought into contact with the mapping axis of the graph.

Finally, it can be seen that by spinning (60) the cones (e.g. rotating the arrays) one at a time, every member of every array can be brought into contact with this axis, which we can now refer to as the mapping axis, as illustrated in FIG. 6. The dimension segments of the mapping axis can be represented as a one-dimensional array. Returning to our NFL example, a mapping array is required with 4 element groups, one group for each dimension. Each group would contain:

1. XML tag name (i.e. Teams, Players, etc.) associated with that dimension;
2. Length of the result array element or element group;
3. Maximum allowable element occurrences in the result array; and
4. Current element occurrences count, which is used to determine the target dimension array index.

As the XML document is parsed by the process, the mapping array group at each dimension holds information pertaining to the cone that is currently spun into contact (e.g. rotationally positioned to align) with the mapping axis. Parsing and mapping begin with the XML document root element, and proceeds by parsing down to cones at successively lower dimensions. Cone elements are mapped as they are encountered.

For example, if during processing the cone elements (spinning in place) at the Teams level, a Player element is encountered representing a lower level cone, then the lower level Players cone is immediately "spun into contact" with the mapping axis. Once the Players cone processing is completed for a team, the mapping array is shifted up one dimension to spin a new Teams cone into place, repeating the process until all cones in the n-dimensional array have been processed.

For further understanding of the invention, we now present a functional, operational example embodiment and application of our tilting tree, spinning cones process for mapping n-dimensional data. The following discussion will use another example of an inbound XML document request, shown in Table 6, with the corresponding COBOL program 4-dimensional table definition, shown in Table 7, and the mapping array it creates.

TABLE 6

Example XML Inbound Data

```
<league>
<league_name>NFL</league_name>
    <division>
        <division_name>AFC</division_name>
            <conference>
                <conference_name>AFC_East</conference_name>
                    <team>
                        <team_name>Dolphins</team_name>
                        <team_games_played>16</team_games_played>
                        <team_player>
                            <player_name>Jay Fiedler</player_name>
                            <player_games_played>16</player_games_played>
                        </team_player>
                        <team_player>
                            <player_Name>Ed Perry</player_Name>
                            <player_games_played>16</player_games_played>
                        </team_player>
                        <team_player>
                            :
                            :
                        </team_player>
                    </team>
                    <team>
                        :
                        :
                    </team>
            </conference>
            <conference>
                :
                :
            </conference>
    </division>
    <division>
        :
        :
    </division>
</league>
```

TABLE 7

Example COBOL Program Statements

01 COBOL-RESULT-ARRAY
   02 LEAGUE-NAME PIC X(20).
   02 DIVISION OCCURS 2 TIMES.
      04 DIVISION-NAME PIC X(03).
      04 CONFERENCE OCCURS 3 TIMES.

TABLE 7-continued

Example COBOL Program Statements

```
      06 CONFERENCE-NAME PIC X(09).
      06 TEAM OCCURS 6 TIMES.
         08 TEAM-NAME PIC X (20).
         08 TEAM-GAMES-PLAYED PIC 9(03).
         08 TEAM-PLAYER OCCURS 70 TIMES
            10 PLAYER-NAME PIC X(20).
            10 PLAYER-GAMES-PLAYED PIC 9(03).
05 DIMENSION-COUNTER PIC S9(4) COMP.
05 MAPPING-ARRAY
   10 DIMENSION-TABLE OCCURS 4 TIMES.
      20 DIMENSION-TAG-NAME          PIC X(32).
      20 DIMENSION-OCCURS-GROUP-LEN  PIC S9(4) COMP.
      20 DIMENSION-OCCURS-MAX-TIMES  PIC S9(4) COMP.
      20 DIMENSION-FIELD-COUNT       PIC S9(4) COMP.
```

According to our example embodiment in an IBM CICS computing environment, when an XML request is received, a SAX (Standard API for XML) parser starts parsing at the beginning of the XML document. The SAX parser is event driven, meaning that when an XML tag name is found (an event), control is given to our tilting tree, spinning cones process for element mapping.

Further according to our example embodiment, the mapping array has two associated control values. The dimension counter indicates the current dimension level being processed for the multi-dimension result array. The dimension array offset is the offset into the array for the beginning of the dimension currently being processed. The fact that the mapping array is one-dimensional is made possible by the concept of tilting the tree into the mapping array axis. Remember, the tree is a two-dimensional representation of the multi-dimensional source array.

For each parser event, processing proceeds as follows:
1. An in-memory repository contains metadata information about the result array structure and result array data elements. The repository is searched for a match of the XML tag name.
2. If the tag name corresponds to an array name (i.e. DIVISION, CONFERENCE, TEAM, or TEAM-PLAYER), then:
    (a) the dimension counter is set to the new result array dimension (this corresponds to spinning a cone into contact with the mapping array);
    (b) the mapping array is loaded with the array tag name, total length of all elements at this and higher dimensions (dimension group length), and maximum array elements;
    (c) the dimension field count is set to 1 so that the next XML data element for this dimension will be mapped to the first slot; and
    (d) the dimension array offset is calculated by multiplying the dimension group length by the current dimension field count for each lower level dimension and summing the result.
3. If the tag name corresponds to an array element (i.e. DIVISION-NAME, CONFERENCE-NAME, TEAM-NAME, TEAM-GAMES-PLAYED, PLAYER-NAME, or PLAYER-GAMES-PLAYED), then:
    (a) the dimension counter is set to the corresponding dimension level; and
    (b) the corresponding tag value is stored in the result slot indicated by the dimension field count plus the dimension array offset (element storing is performed in conjunction with the repository, which contains the element result array offset for slot 1, element length, and element type (alphanumeric, numeric, etc.));
    (c) the dimension field count is incremented by 1; and
    (d) the next successive array element at the same dimension level is processed (corresponding to spinning a cone in place) as just described until all elements at this dimension have been stored.

While the immediately preceding explanation may appear simple and straightforward, actual code implementation is somewhat more complex to be able to handle the COBOL array definitions shown in Table 8. In this example, notice that TEAM-LOCATION is an element of the TEAM array, but follows the higher dimension array for TEAM-PLAYER. The CONFERENCE-BOARD array is an array of equal dimension to the CONFERENCE array, both under the DIVISION array, and follows the higher level arrays of TEAM and TEAM-PLAYER.

TABLE 8

Example COBOL Implementation

```
01 COMMAREA.
   02 LEAGUE-NAME        PIC X(20).
   02 DIVISION OCCURS 2 TIMES.
      04 DIVISION-NAME PIC X(03).
      04 CONFERENCE OCCURS 3 TIMES.
         06 CONFERENCE-NAME PIC X(09).
         06 TEAM OCCURS 6 TIMES.
            08 TEAM-NAME PIC X(20).
            08 TEAM-GAMES-PLAYED PIC 9(03).
            08 TEAM-PLAYER OCCURS 70 TIMES.
               10 PLAYER-NAME PIC X(20).
               10 PLAYER-GAMES PLAYED PIC 9(03).
            08 TEAM-LOCATION      PIC X(20).
      04 CONFERENCE-BOARD OCCURS 12 TIMES.
         06 CONFERENCE-BOARD-MEMBER-NAME PIC X(20).
```

Those skilled in the art will readily recognize that the various aspects of embodiments disclosed herein are provided as illustrative details, and do not represent limitations of the scope of the present invention. Alternate computing platforms, programming methodologies, communications protocols, and storage technologies can be employed to realize the present invention. Therefore, the scope of the present invention should be determined by the following claims.

What is claimed is:

1. A method for mapping n-dimensional array data ("source data") initially represented in markup language to an n-dimension table ("target data") suitable for use by business application programs, said method comprising the steps of:
    (a) establishing a searchable repository which contains metadata information about a result array structure and one or more result array data elements;
    (b) parsing said source data to find a first or next tag name;
    (c) if a found tag name corresponds to an array name, then performing the steps of:
        (i) setting a dimension counter to the new result array dimension;
        (ii) loading a mapping array with the array tag name, total length of all elements at this and higher dimensions (dimension group length), and maximum array elements;
        (iii) setting a dimension field count to 1; and
        (iv) calculating a dimension array offset by multiplying the dimension group length by the current dimension field count for each lower level dimension and summing the result;

(d) if a found tag name corresponds to an array element, then performing the steps of:
  (i) setting a dimension counter to the corresponding dimension level;
  (ii) storing the corresponding tag value in a result slot indicated by the dimension field count plus the dimension array offset;
  (iii) incrementing said dimension field count by 1; and
  (iv) repeating said steps (d)(i), (d)(ii) and (d)(iii) for successive source data elements at the same dimension level until all elements at this dimension have been stored;
(e) and repeating steps (b), (c) and (d) until all dimensions of said source data have been mapped.

2. The method as set forth in claim 1 wherein said step of storing corresponding tag values is performed in conjunction with the repository, which contains the element result array offset for slot 1, element length, and element type.

3. The method as set forth in claim 1 further comprising the step of pre-loading state data in said target data array.

4. The method as set forth in claim 1 wherein said step of parsing said source data comprises parsing a data structure defined in Extensible Markup Language.

5. The method as set forth in claim 1 further comprising the step of using said target data array by a Common Business Oriented Language application program.

6. The method as set forth in claim 1 wherein said step of parsing said source data array comprises employing a Standard Application Programming Interface for Extensible Markup Language parser.

7. A computer readable medium encoded with software for mapping n-dimensional array data ("source data") initially represented in markup language to an n-dimension table ("target data") suitable for use by business application programs, said software performing the steps of:
  (a) establishing a searchable repository which contains metadata information about a result array structure and one or more result array data elements;
  (b) parsing said source data to find a first or next tag name;
  (c) if a found tag name corresponds to an array name, then performing the steps of:
    (i) setting a dimension counter to the new result array dimension;
    (ii) loading a mapping array with the array tag name, total length of all elements at this and higher dimensions (dimension group length), and maximum array elements;
    (iii) setting a dimension field count to 1; and
    (iv) calculating a dimension array offset by multiplying the dimension group length by the current dimension field count for each lower level dimension and summing the result;
  (d) if a found tag name corresponds to an array element, then performing the steps of:
    (i) setting a dimension counter to the corresponding dimension level;
    (ii) storing the corresponding tag value in a result slot indicated by the dimension field count plus the dimension array offset;
    (iii) incrementing said dimension field count by 1; and
    (iv) repeating said steps (d)(i), (d)(ii) and (d)(iii) for successive source data elements at the same dimension level until all elements at this dimension have been stored;
  (e) and repeating steps (b), (c) and (d) until all dimensions of said source data have been mapped.

8. The computer readable medium as set forth in claim 7 wherein said software is configured for storing corresponding tag values in conjunction with the repository, which contains the element result array offset for slot 1, element length, and element type.

9. The computer readable medium as set forth in claim 7 wherein said software further comprises software for pre-loading state data in said target data array.

10. The computer readable medium as set forth in claim 7 wherein said software for parsing said source data comprises software for parsing a data structure defined in Extensible Markup Language.

11. The computer readable medium as set forth in claim 7 wherein said software further comprises software for using said target data array by a Common Business Oriented Language application program.

12. The computer readable medium as set forth in claim 7 wherein said software for parsing said-source data array comprises software for a Standard Application Programming Interface for Extensible Markup Language parser.

13. A system for mapping markup language n-dimensional array data ("source data") to an n-dimension table ("target data") suitable for use by business application programs, said system comprising:
  (a) a searchable repository which contains metadata information about a result array structure and one or more result array data elements;
  (b) a source data parser configured to find a first or next tag name within said source data;
  (c) an array dimension processor configured to perform the following steps if a found tag name corresponds to an array name:
    (i) setting a dimension counter to the new result array dimension;
    (ii) loading a mapping array with the array tag name, total length of all elements at this and higher dimensions (dimension group length), and maximum array elements;
    (iii) setting a dimension field count to 1; and
    (iv) calculating a dimension array offset by multiplying the dimension group length by the current dimension field count for each lower level dimension and summing the result;
  (d) an array element processor configured to perform the following steps if a found tag name corresponds to an array element:
    (i) setting a dimension counter to the corresponding dimension level;
    (ii) storing the corresponding tag value in a result slot indicated by the dimension field count plus the dimension array offset;
    (iii) incrementing said dimension field count by 1; and
    (iv) repeating said steps (d)(i), (d)(ii) and (d)(iii) for successive source data elements at the same dimension level until all elements at this dimension have been stored;
  (e) and an array mapping controller configured to repetitively operate said parser, said array dimension processor, and said array element processor until all dimensions and all elements of said source data have been mapped.

14. The system as set forth in claim 13 wherein said array element processor is configured to perform said step of storing in conjunction with the repository, which contains the element result array offset for slot 1, element length, and element type.

15. The system as set forth in claim 13 further comprising a target data pre-loader configured to pre-loadstate data in said target data array.

16. The system as set forth in claim 13 wherein parser is configured to parse Extensible Markup Language.

17. The system as set forth in claim 13 further comprising a Common Business Oriented Language application program which receives and uses said target data array.

18. The system as set forth in claim 13 wherein parser comprises a Standard Application Programming Interface for Extensible Markup Language parser.

* * * * *